UNITED STATES PATENT OFFICE.

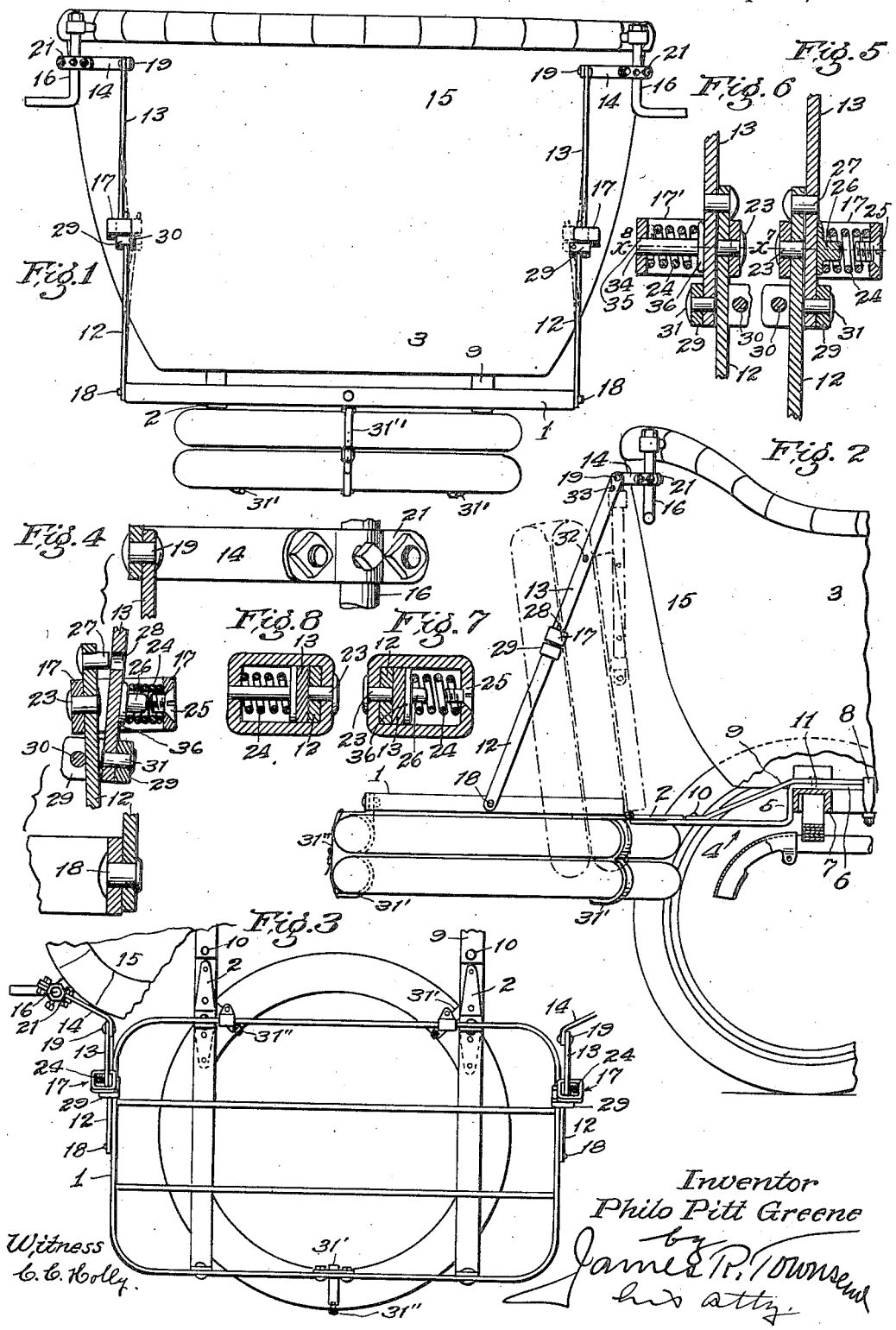

PHILO PITT GREENE, OF FILLMORE, CALIFORNIA.

LUGGAGE-CARRIER.

1,179,824.   Specification of Letters Patent.   Patented Apr. 18, 1916.

Application filed September 13, 1915. Serial No. 50,500.

*To all whom it may concern:*

Be it known that I, PHILO PITT GREENE, a citizen of the United States, residing at Fillmore, in the county of Ventura and State of California, have invented a new and useful Improvement in Luggage-Carriers, of which the following is a specification.

This invention relates to that class of improvements upon the combined baggage and tire holder for which I filed application for Letters-Patent of the United States on May 29, 1915, Serial No. 31,289 and which broadly comprises a pivotally supported tilting rack having tire-holding means mounted upon its back; said rack being pivotally mounted on a horizontal axis and adapted to swing downward into baggage-holding position and to tilt upward to extend adjacent to the rear end of a vehicle body when not in use as a baggage-holder.

An object of the invention is to increase the convenience of adjusting the rack and baggage-holder, to and from horizontal position.

Other objects are simplicity, strength, ease of construction and facility of adjustment.

The invention is capable of being embodied in various forms and I do not limit myself to specific construction.

The accompanying drawings illustrate the invention in forms in which it may be embodied.

Figure 1 is a rear elevation of the luggage-holder applied to an automobile and adjusted into position to receive baggage. Two tires are shown connected to the tire support. Dotted lines indicate the inward deflection of the joints of the extensible connection for the purpose of unlocking the same so it can be adjusted. Fig. 2 is a side elevation of the luggage carrier shown in Fig. 1, the parts being shown in the same position as in Fig. 1 by solid lines and in a collapsed position in dot-and-dash lines. Fig. 3 is a plan of the luggage-holder shown in Figs. 1 and 2, and also fragments of the vehicle shown in said figures. Fig. 4 is a fragmental view of the pivotal connection from the right side in Fig. 1. Fig. 5 is an axial section of the lock-joint of one of the pivotal connections. Fig. 6 is an axial section analogous to Fig. 5 and showing another form of construction. Figs. 7 and 8 are cross sections on lines $x^7$ and $x^8$, Figs. 5 and 6 respectively.

The luggage carrier comprises a tray, leaf or rack 1 that may be of any desired and convenient construction hinged by any suitable means, and is shown as a grid hinged by barn-door hinges 2, which constitute means for hinging the rack at one level, on a horizontal axis $a$, to the vehicle 3; this being effected through the medium of a detachable bracket having a main limb 4, which is provided with a bayonet bend 5 terminating in an arm 6 to fit above the frame member 7 of the vehicle and clamped by a clip 8 to the frame or chassis of said vehicle and braced by a slanting brace 9 that is fastened to said main limb 4 of the bracket by rivet 10. The overlying arm of the brace 9 is fixed to the arm 8 by the rivet 11.

The adjustable connection between the rack and vehicle body is in the form of longitudinally extensible and retractable stays pivoted to the body and the rack. Each stay for supporting the rack 1 comprises upper and lower relatively sliding members in the form of flat resilient links 12, 13 that are respectively connected to the rack 1 and to a support in the form of an arm 14 that is connected to the automobile body 15 by means of a standard 16 connected directly to said body and which may be a portion of the support for the canopy top of the automobile.

In each of the stays the two links 12, 13 are extensibly and retractably connected together by means of a box loop 17 shown in a general way in Figs. 1, 2 and 3; the link 12 being pivoted by a pivot 18 to the rack, and the link 13 being pivoted by a pivot 19 to the arm 14; said arm being connected to the standard 16 by adjusting means, as a clip 21, whereby it may be adjusted up and down on the standard and fixed at any height therealong, thus to adjust the rack to a level position or to any desired inclination when the stays are fully extended and the rack is fully lowered.

The loops hold the links from relative lateral displacement. The axes of the pivots 18, 19 are in parallelism with the horizontal axis of the hinged connection 2 between the rack 1 and the bracket 4. The two links 12, 13 of each stay are held from being pulled apart endwise. This is done by means of stops formed of the loops that hold the links together at their meeting points; there being for this purpose the box loops 17 fastened by suitable means as rivets 23 to one of the links of each stay at the meeting-points of said links, as shown clearly at 17 in Figs. 4 and 5 and at 17′ in Fig. 6.

The meeting ends of the links of each stay are pressed together by resilient means as the spring 24 in said Figs. 4 and 5, and held in place by a screw 25 on the loop and a stud 26 on the companion link 13. One of the links is provided with a tooth formed by a stud 27 to enter a seat 28 in the companion link 13 under the action of the spring 24. A guide formed of a loop 29, constituting one of said stops, and cross-bars 30, is fixed to the end of the companion link 13 at the side of the box-loop 17 opposite the stud 27. Said loop 29 and cross-bar 30 constitute guiding means to slidingly hold the end of the second link 13 in position adjacent to the link 12. The loop 29 may be fixed by any suitable means as by a rivet 31 to the end of the link 13. As in the former application, reserve wheel or tire-supporting means 31', 31'' are provided to support the reserve wheels or tires on the under or back side of the rack.

In practical use, when it is desired to collapse or tilt up the rack, the attendant will stand behind the lower rack, and placing his hands outside the stays will press the joints of the stays inward simultaneously, thus pressing the joints toward each other. He will thus bow the stays in at the joints as indicated by dot-and-dash lines in Fig. 1; the same being the position shown in solid lines in Fig. 4; thus allowing the attendant to push up on the rack with his knee, thereby bringing the studs 27 and their seats out of alinement; whereupon he may let go of the adjustable connections and by means of his hands up-tilt the rack into the second position to catch the studs in the second seat 32; and thence in like manner on to the practically upright or vertical position shown in dot-and-dash lines in Fig. 2; taking care as the studs 27 pass the intermediate seats 32, to press the connections in as before, so that the studs 27 may pass said seats 32 and finally reach the top seat 33; it being understood that if it is desired, the studs 27 may be allowed to seat in the seats 32 so that the rack will be supported at a wider angle with the automobile body than is shown by the dot-and-dash lines in Fig. 2. By means of the studs 27 and seats 28, 32 and 33 the connections formed by the stays the members may be relatively locked in different stages of extension. To lower the device the joints are pressed toward each other, thus releasing the latch or lock formed by the studs and the seats therefor, whereupon the rack can be lowered to intermediate and horizontal position. The links are sufficiently resilient to allow the stays to be thus pressed in at the joints, thereby to relatively cant the links and to automatically withdraw the studs from their seats. The springs 24 are sufficiently strong to hold said studs normally seated as shown in Figs. 5 and 6.

In Fig. 6 a guide-pin 34 is seated on the side of the link 13 and projects through the spring and through a hole 35 in the box-loop. In each form the guide-pin has a broad flat head 36 on which the spring presses to hold the pin in place. The studs 27 may be practically formed of rivets upset in holes therefor in the links so that they will not become loose or fall out.

I claim:

1. The combination with a vehicle and a rack hinged thereto; of an adjustable stay pivotally connected to the rack and to the vehicle and comprising two links in slidable relation to each other; loops at the meeting point of the links to hold the links together, one of said loops being fixed to one of the links and extending around the companion link, a tooth on one of said links; and a seat therefor on the companion link to hold the links in fixed relation to each other.

2. The combination with a vehicle and a rack hinged thereto; of an adjusting stay pivotally connected to the rack and to the vehicle and comprising two links in slidable relation to each other; loops at the meeting point of the links to hold the links together, one of said loops being fixed to one of the links and extending around the other link; a tooth on one of said links; a seat therefor on the companion link to hold the links in fixed relation to each other; and a spring between the loop and the link to hold the tooth in its seat.

3. The combination with a vehicle and a rack hinged thereto on a horizontal axis; of a stay pivotally connected to the rack and to the vehicle and comprising two links in slidable relation to each other, and loops at the meeting point of said links to hold the links together; one of said links being provided with a tooth and the companion link with a plurality of seats for said tooth to hold the stay in various stages of extension.

4. The combination with a vehicle and a rack hinged thereto on a horizontal axis; of a stay pivotally connected to the rack and to the vehicle and comprising two links in slidable relation to each other; loops at the meeting point of said links to hold the links together; one of said links being provided with a tooth and the companion link with a plurality of seats for said tooth to hold the stay in various positions; and a spring in the space between the loop and the companion link to yieldingly hold the tooth in the seats respectively.

5. In a luggage-carrier the stay set forth comprising two links in slidable relation to each other provided at their meeting points with loops; a tooth on one of said links and a seat on the other link for engagement to prevent relative longitudinal movement of the links; and yielding means to hold the links together with the tooth engaging its seat.

6. The combination with two links longitudinally adjustable with relation to each other; of means to loosely hold the links from relative lateral displacement; a tooth and a seat therefor in the links respectively to prevent longitudinal movement of the links; a loop fixed to one of the links and extending around the other link and spaced apart from said other link; and a spring between said loop and said other link to hold the links together.

7. The combination with two links longitudinally adjustable with relation to each other; of means to loosely hold the links from lateral displacement; a tooth and a seat therefor in the links respectively to prevent longitudinal movement of the links; a loop fixed to one of the links and extending around the other link and spaced apart from said other link; a spring between said loop and said other link to hold the links together; and a spring guide seated on said other link to hold the spring from displacement from the loop.

8. The combination with two links longitudinally adjustable with relation to each other; of means to loosely hold the links from lateral displacement; a tooth and a seat therefor in the links respectively to prevent longitudinal movement of the links; a loop fixed to one of the links and extending around the other link and spaced apart from said other link; a spring between said loop and said other link to hold the links together; and a guide comprising a pin having a flat head resting on a link and supporting the spring, the stem of said pin extending into the spring to hold the spring in place.

9. The combination with two links longitudinally adjustable with relation to each other; of means to loosely hold the links from lateral displacement; a tooth and a seat therefor in the links respectively to prevent longitudinal movement of the links; a loop fixed to one of the links and extending around the other link and spaced apart from said other link; a spring between said loop and said other link to hold the links together; and a guide comprising a pin having a flat head resting on a link and extending through the loop, the stem of said pin extending into the spring to hold the spring in place.

In testimony whereof, I have hereunto set my hand at Fillmore Ventura county, California, this 4th day of Sept. 1915.

PHILO PITT GREENE.

In presence of—
T. H. ZIMMERMAN.